(12) United States Patent
Ward (10) Patent No.: US 6,304,903 B1
(45) Date of Patent: Oct. 16, 2001

(54) STATE MACHINE FOR COLLECTING INFORMATION ON USE OF A PACKET NETWORK

(75) Inventor: Robert G. Ward, Colorado Spring, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 08/904,511

(22) Filed: Aug. 1, 1997

(51) Int. Cl.[7] .............................. G06F 7/06; G06F 17/40

(52) U.S. Cl. ............................................................ 709/224

(58) Field of Search ................................... 370/232, 233, 370/234; 709/224

(56) References Cited

U.S. PATENT DOCUMENTS

| | | | |
|---|---|---|---|
| 5,179,549 | * 1/1993 | Joos et al. | 370/232 |
| 5,351,243 | * 9/1994 | Kalkunte et al. | 370/475 |
| 5,422,838 | * 6/1995 | Lin | 365/49 |
| 5,761,191 | * 6/1998 | VanDervort et al. | 370/232 |
| 5,916,305 | * 6/1999 | Sikdar et al. | 709/236 |

OTHER PUBLICATIONS

"Real–Time Mechanism for Accounting and Network Access Control", IBM TDB 1994, 94A 61180 v.37 n.4A, pp337–340.*

* cited by examiner

Primary Examiner—Dung Dinh (57) ABSTRACT

A protocol analyzer includes an input buffer, a lookup table and a counter memory. The input buffer includes a frame header buffer and the lookup table comprises a state machine including a CAM and a RAM. A frame is stored in the frame header buffer while the CAM and RAM analyze predetermined portions of it. If a portion is eight bits or less, it is input into the RAM and the RAM outputs instructions stored at the location indicated by the data portion. If the portion is greater than eight bits, it is input into the CAM, which outputs a RAM address at which corresponding instructions are stored. The instructions can include an instruction to increment a count in a predetermined register of the counter memory; an instruction to add a new count register in the counter memory; an instruction to generate a snapshot trigger to cause a capture RAM to store a specific data segment traveling on the packet network; and an instruction to further analyze the data portion. The instruction to further analyze the data portion includes an address offset to indicate the location of the next data segment to be analyzed. The protocol analyzer does not include a processor, and is not operated by software; it can analyze all data frames on a packet network, even at gigabit transfer rates.

20 Claims, 8 Drawing Sheets

STATE MACHINE FOR COLLECTING INFORMATION ON USE OF A PACKET NETWORK

BACKGROUND OF THE INVENTION

1. Field of the Invention

The present invention relates to the collecting of information relating to the use of a communications bus, which is commonly called network statistics. More particularly, the present invention relates to a packet network protocol analyzer that utilizes a content addressable memory (CAM).

2. Statement of the Problem

Communication systems in which information is transmitted in data packages between a header and trailer that provide information regarding the data package are generally called packet networks. There are many kinds of packets that can be sent over a given packet network, each of which is defined by a set of rules or conventions called protocols. A packet or frame generally includes a header, a trailer, and a payload sandwiched between the header and trailer. The protocol for a given packet, or frame, generally defines the content of the frame header and frame trailers, as well as the relative position of the data package, or payload, in the frame. Protocol analyzers connect to the communications bus of a packet network and collect and store information relating to the packets that are traveling on the bus. Such information may include the type of packet, for example, IBM, Novell, or Appletalk, the number of bits in the frame, and many other types of information. This information is useful for network designers and supervisors in determining equipment requirements, the source of network problems, and generally in supervising the network.

Traditionally, protocol analyzers have utilized microprocessors programmed by software to collect and store the packet information. State-of-the-art data communication networks are very fast, with data transfer at the rate of gigabits per second. Software-based systems cannot keep up with the incoming traffic flow in such high-speed data systems. One common prior art solution to this problem is to sample the data. Thus, the data is of a statistical nature, hence the term "network statistics". Such conventional protocol analyzers can be inaccurate and some events may be totally missed. Prior art solutions to this problem also include the use of pre-filtering to discard unwanted frames thus reducing the packet rate before the software processes the traffic. However, if all or a large percentage of the frames are frames that it is desired to sample, then this solution is not workable.

Another solution is the use of a custom integrated circuit (IC) that utilizes an algorithm to direct the sampling in a manner that selects meaningful frames. However, any sampling solution is not acceptable for a protocol analyzer targeted at the R&D market. R&D people expect to see absolute measurements and not approximations. Moreover, at gigabit data transfer speeds, the sampling is at such a low rate compared to the traffic rate that the algorithms may no longer be valid for making meaningful measurements.

State machines are generally known in the electronics industry, but these have not been used up to now as protocol analyzers, primarily because there are so many different packet network protocols, and each protocol is quite complex, so that it has come to be believed in the art that a state machine capable of analyzing protocols would be so large and complex that it would be unworkable. Further, new protocols are constantly being introduced and old protocols are constantly changing, and it is known that it is much easier to alter a software program to handle new and revised protocols than to reprogram a state machine, which is essentially hardware.

3. Solution to the Problem

The present invention solves the above and other problems in prior art protocol analyzers and network statistics methods by providing a state machine that collects and stores bus communications data. The state machine is entirely hardware-based, and includes no processors that utilize software. As a result it can operate at gigahertz speeds and does not need to sample data.

The state machine also includes a CAM and a random access memory (RAM) that can be reprogrammed as easily as writing software, and thus constantly changing protocols do not create a problem for the protocol analyzer according to the invention.

The protocol analyzer includes an input buffer, a lookup table and a counter memory. The input buffer includes a frame header buffer. The lookup table comprises a state machine including a CAM and a RAM. A frame is stored in the frame header buffer while the CAM and RAM analyze predetermined portions of it. If a data portion is eight bits or less, it is input into the RAM and the RAM outputs instructions stored at the location indicated by the data portion. If the portion is greater than eight bits, it is input into the CAM, which outputs a RAM address at which corresponding instructions are stored. The instructions can include an instruction to increment a count in a predetermined register of the counter memory; an instruction to add a new count register in the counter memory; an instruction to generate a snapshot trigger to cause a capture RAM to store a specific data segment traveling on the packet network; and an instruction to further analyze the data portion.

The invention provides apparatus for collecting network statistics information on a packet network, the apparatus comprising: an input buffer for storing a data packet traveling on the packet network; an electronic lookup table, communicating with the buffer, for analyzing at least a portion of the data packet and for providing an output signal including a statistics signal representative of the statistics information, the lookup table comprising a state machine; and an electronic memory, communicating with the lookup table, for storing the network statistics. Preferably, the state machine comprises a content addressable memory (CAM). Preferably, the state machine further comprises a random access memory (RAM). Preferably, the input buffer includes a logic unit for inputting the portion of the data packet into the CAM if its number of bits is greater than a predetermined number and inputting the portion of the data packet into the RAM if its number of bits is less than or equal to the predetermined number, and preferably, the predetermined number of bits is eight bits. Preferably, the state machine includes a content addressable memory (CAM) manager logic unit including a CAM and a random access memory (RAM) manager logic unit including a RAM, and the output signal comprises a signal output by the RAM manager logic unit. Preferably, the state machine comprises a field programmable gate array (FPGA). Preferably, the apparatus further includes a capture RAM in communication with the state machine. Preferably, the state machine has an input and an output and the output is electronically connected to the input. Preferably, the output signal comprises an instruction selected from the group consisting of: an instruction to increment a count in a predetermined register of the memory; an instruction to add a new count register in the memory; an instruction to generate a snapshot trigger to cause a capture RAM to store a specific data segment traveling on the packet network; and an instruction to further analyze the data portion. Preferably, there are a plurality of the data packets traveling sequentially on the packet network, the buffer stores the plurality of packets, there are a plurality of the state machines, and different ones of the state machines analyze different ones of the data packets. Preferably, data packet includes a header and the input buffer includes a header buffer for storing the header of the data packet. Preferably, the state machine includes an inter-switch link (ISL) header detector. Preferably, the input buffer includes a first in first out register, commonly referred to as a FIFO. Preferably, the output signal includes a trigger signal and the apparatus includes a logic unit responsive to the trigger signal for storing the peripheral component interconnect (PCI) address of a particular data packet. Preferably, the apparatus includes an internal bus and a multiplexer for multiplexing signals traveling on the packet network onto the internal bus. Preferably, the electronic memory includes a first counter portion and a second counter portion and the apparatus further includes heartbeat control logic for swapping the first counter portion and the second counter portion between an active state in which the counter is used to collect statistics information and an inactive state in which the counter is read. Preferably, the portion of the data packet comprises a first signal located at a first address in the data packet and the output signal includes a delta address signal corresponding to an offset value, and the state machine includes an address generator responsive to the delta address signal for providing an address signal corresponding to a second address in the data packet offset from the first address by the offset value.

In another aspect, the invention provides apparatus for collecting network statistics information on a packet network, the apparatus comprising: a buffer for storing a data packet traveling on the packet network; an electronic lookup table, communicating with the buffer, for analyzing at least a portion of the data packet and for providing an output signal including a statistics signal representative of the statistics information, the lookup table comprising a content addressable memory (CAM); and a first electronic memory, communicating with the lookup table, for storing the network statistics. Preferably, the state machine includes a second electronic memory, and the output signal comprises an address in the second electronic memory. Preferably, the lookup table includes a signal selector for outputting a predetermined signal if the portion of the data packet does not match data in the CAM. Preferably, the lookup table includes a logic unit for writing information to the CAM and the signal includes an instruction to the logic unit to cause it to write a new content pattern into the CAM, the new content pattern corresponding to a portion of the data packet pattern traveling on the packet network that was not previously seen by the apparatus.

In a further aspect, the invention provides apparatus for collecting network statistics information on a packet network, the apparatus comprising: a buffer for storing a data packet traveling on the packet network; an electronic lookup table, communicating with the buffer, for analyzing a first portion of the data packet located at a first address and providing an address offset value, for analyzing a second portion of the data packet located at an address offset from the first address by the offset value, and for providing and a network statistics signal representative of the statistics information; an electronic memory, response to the network statistics signal, for storing the network statistics. Preferably, the lookup table comprises: a content addressable memory (CAM) and a random access memory (RAM) for providing a delta address signal corresponding to the offset value; and an address generator response to the delta address signal for generating the address of the second portion of the data packet.

In still another aspect the invention provides a method of collecting network statistics information on a packet network, the method comprising: storing a data packet traveling on the packet network in a buffer; inputting a first signal representing a portion of the data packet located at a first address into an electronic state machine to produce a delta address signal corresponding to an offset value; inputting a second signal representing a portion of the data packet located at a second address offset from the first address by the offset value into the electronic state machine to produce a statistics information signal; and storing a signal related to the statistics information signal in an electronic memory, thereby recording the network statistics.

In yet a further aspect, the invention provides a method of collecting network statistics information on a packet network, the method comprising: storing a data packet traveling on the packet network in a buffer; inputting a first signal representing at least a portion of the data packet into an electronic state machine causing the state machine to output a second signal; and storing a signal related to the second signal in an electronic memory, thereby recording the network statistics. Preferably, the step of inputting and causing comprises inputting the second signal back into the state machine causing it to output a third signal. Preferably, the electronic state machine is capable of a CAM cycle in which a signal input into the state machine is input into a content addressable memory (CAM) and a RAM cycle in which a signal input into the state machine is input into a random access memory (RAM), wherein the second signal includes an instruction as to whether the next cycle to be executed by the state machine is a CAM cycle or a RAM cycle, and the step of inputting the second signal comprises inputting the instruction thereby causing the state machine to execute a predetermined one of the CAM and RAM cycles. Preferably, the step of inputting comprises inputting the first signal into a content addressable memory (CAM) causing the CAM to output an address and inputting the address into a random access memory (RAM) and causing the RAM to output the second signal.

The invention not only provides an extremely fast protocol analyzer, it also does this in a manner that allows the statistics gathering system to be manufactured and reprogrammed at a relatively low cost. Numerous other features, objects and advantages of the invention will become apparent from the following description when read in conjunction with the accompanying drawings.

DESCRIPTION OF THE PREFERRED EMBODIMENT

OVERVIEW

As discussed above, this disclosure relates to protocol analyzers that are commonly used to gather and store information on the use of communications networks, and packet networks in particular. In the art the gathered information is commonly referred to as "statistics" or "network statistics" and thus we shall use these terms to denote the information collected by the protocol analyzers according to the invention. However, it should be understood that the data collected by the protocol analyzer according to the invention may not be statistical in nature, since in the preferred embodiment, information on every packet transferred on a network can be gathered, even at gigabit transfer rates.

In the electronics art the term state machine has come to mean digital electronics hardware that runs at hardware speeds; the term is usually contrasted to processor-based systems that operate using software, and are therefore much slower than pure hardware systems. However, in the most general usage the term sometimes means any system that operates with discrete logic, which could include software-based systems. In this disclosure state machine means a discrete (as opposed to analog) logic electronics system implemented in hardware. That is, in this disclosure, the term state machine does not include a processor running a software program. This use of the term is consistent with current usage in the art, but is narrower than the broadest uses of the term.

In this disclosure, for simplicity, we shall sometimes refer to a signal line and the signal carried by the line by the same number. This will greatly reduce the integers in the drawings, and should cause no confusion, since, in each case in which this is done, the line carries a specified signal. For example, the line 30 in FIG. 1 carries data signal 30. In many cases the signal will also be referred to by a descriptive name, such as "Data" written on line 30.

Figure 1:
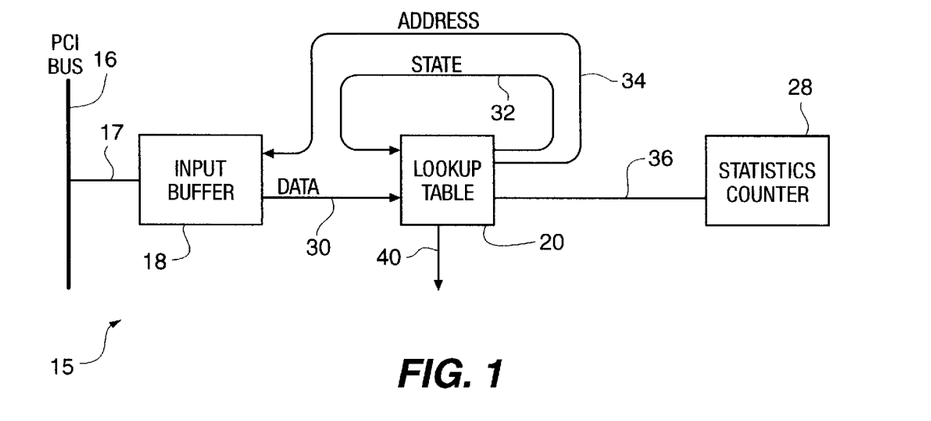
FIG. 1 is a block diagram showing a generalized logical description of a protocol analyzer according to the invention.

Turning to FIG. 1, a generalized block diagram of a protocol analyzer 15 according to the invention is shown. This block diagram is useful in introducing the general concept of how the system according to the invention can analyze a complicated subject matter, such as a packet network frame, in a simple manner without using software. The generalized protocol analyzer 15 includes an input buffer 18, a lookup table comprising an algorithmic state machine (ASM) 20, and a statistics counter 28. Input buffer 18 accepts and stores, via line 17, information that passes on the PCI bus 16. It may be designed to accept and store only certain portions of the bus information, such as headers and trailers, headers only, or may sample the information if only a statistical picture of the bus traffic is desired. Buffers that accomplish such tasks without software are known in the art. The information stored in buffer 18 is passed to lookup table 20 with appropriate timing so that lookup table 20 is kept busy as long as there is information in buffer 18. Lookup table 20 logically is a simple one-to-one table having a first portion that stores digital code that corresponds to data segments of interest that may pass on the bus 16, and a second portion that has instructions concerning what should be done if a specific data segment is found. Lookup table 20 compares each piece of data coming in on line 30 to the data sets in the first portion of the table, and responds by outputting on lines 32, 34, and 36 predetermined signals stored in a corresponding position in the second portion of the table. At the simplest level, the output on line 36 may simply be signals representative of the network statistics information that cause one or more counters in statistics counters 28 to be incremented. For example, the table might recognize a data segment that indicates a Novell™ packet and increment a counter in statistics counters 28 that counts Novell™ packets. It will at the same time tell the input buffer 18 via line 34 to pass new data. Usually however, the output of the table will be more complex. The result of examining the data segment will be ambiguous, and the table 20 will output signals on line 32 that changes its state, that is, it tells itself to further examine the data segment to resolve the ambiguities. Or the output may be a combination of signals on lines 32, 34 and 36. Thus, lookup table 20 is a state machine: i.e., for each discrete data segment presented, it outputs some predetermined discrete signals that result in network statistics being recorded. The philosophy of the system 15 is to have hardware 20 that is mostly ignorant of the protocol structure but able to support an algorithm for decoding protocols that are to be coded in a basic set of instructions in the "lookup" part of state machine.

In summary, depending upon the input data pattern and the current state, the algorithmic state machine 20 (ASM) will request a new piece of data, record some statistics, ask for some instruction to be executed and move on to the next state. The instructions could be: Increment a count in a statistics register; Add a new entry to the statistics counters; Generate a snapshot trigger which, via line 40 tells a capture RAM (FIGS. 2 and 3) to store a specific data segment; Further analyze the data portion; and Other housekeeping functions, such as performing a compare to be described below.

In this disclosure we describe an embodiment of the algorithmic state machine (ASM) 15 that performs protocol determination. In addition to protocol determination, an algorithm can be written and stored in lookup table 20 to gather statistics on address information, to provide node statistics, and to provide connection statistics. The complexity of the algorithm executed will impact the number of frames per second that can be analyzed. However, by using multiple lookup tables 20 that operate on sequential frames, a system can be constructed that can handle as many frames as desired in as much detail as desired.

Figure 2:
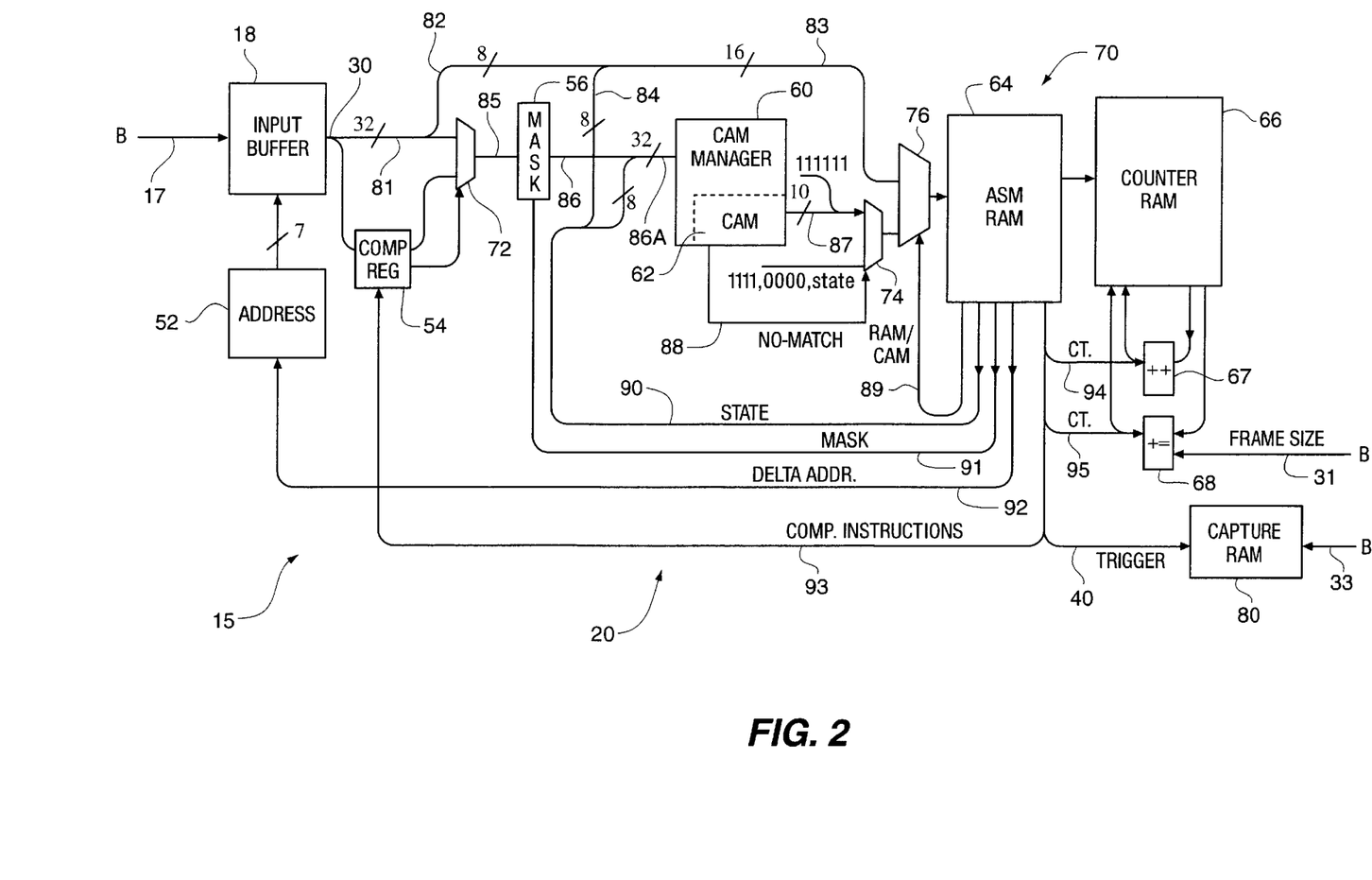
FIG. 2 is a block diagram showing a detailed logical description of a preferred embodiment of a protocol analyzer according to the invention.

From the above general description, it is clear that the lookup table 20 will have to hold a large amount of data and operate very fast. The combination of a fast content addressable memory (CAM) and a fast random access memory (RAM) is able to satisfy this requirement. A CAM matches input data to data contained in the memory, and produces an address corresponding to the data. A RAM provides an output stored in the memory at the address input to the memory. How this combination is able to act as a large, fast lookup table can be seen by referring to FIG. 2, which is a logical block diagram of the preferred embodiment of the protocol analyzer 15 according to the invention. Note that there is not a one-to-one correspondence between each portion of FIG. 1 and each portion of FIG. 2, since FIG. 1 has been simplified to better introduce the concepts of the invention. Note that FIG. 2 is also a simplified version of the actual protocol analyzer 15: for example, it does not include all the functions of the preferred embodiment of the ASM 20 (which will be fully described below) so the essential functions are not obscured in this overview. The simplified protocol analyzer 15 includes input buffer 18, address generator 52, compare register 54, mask 56, and algorithmic state machine (ASM) 20, which includes CAM manager logic 60 including CAM 62, ASM RAM 64 and selectors 72, 74, and 76. Protocol analyzer 15 also includes counter RAM 66, increment latch 67 and adder latch 68. A capture RAM 80, which is not part of ASM 20 but is driven by the output of ASM 20, is also shown in FIG. 2. The logic system of FIG. 2 receives input on line 17 from bus 16 (FIG. 1), which is indicated by the "B" in FIG. 2. In the preferred embodiment bus 16 is a PCI bus. In this figure and subsequent figures the lines, such as 81 are often multi-conductor lines, with the number of conductors and thus the number of bits transferable on a line indicated by a slash and a number. For example, the "32/" symbol on line 81 indicates that it is capable of carrying up to 32 bits simultaneously.

Figure 6:
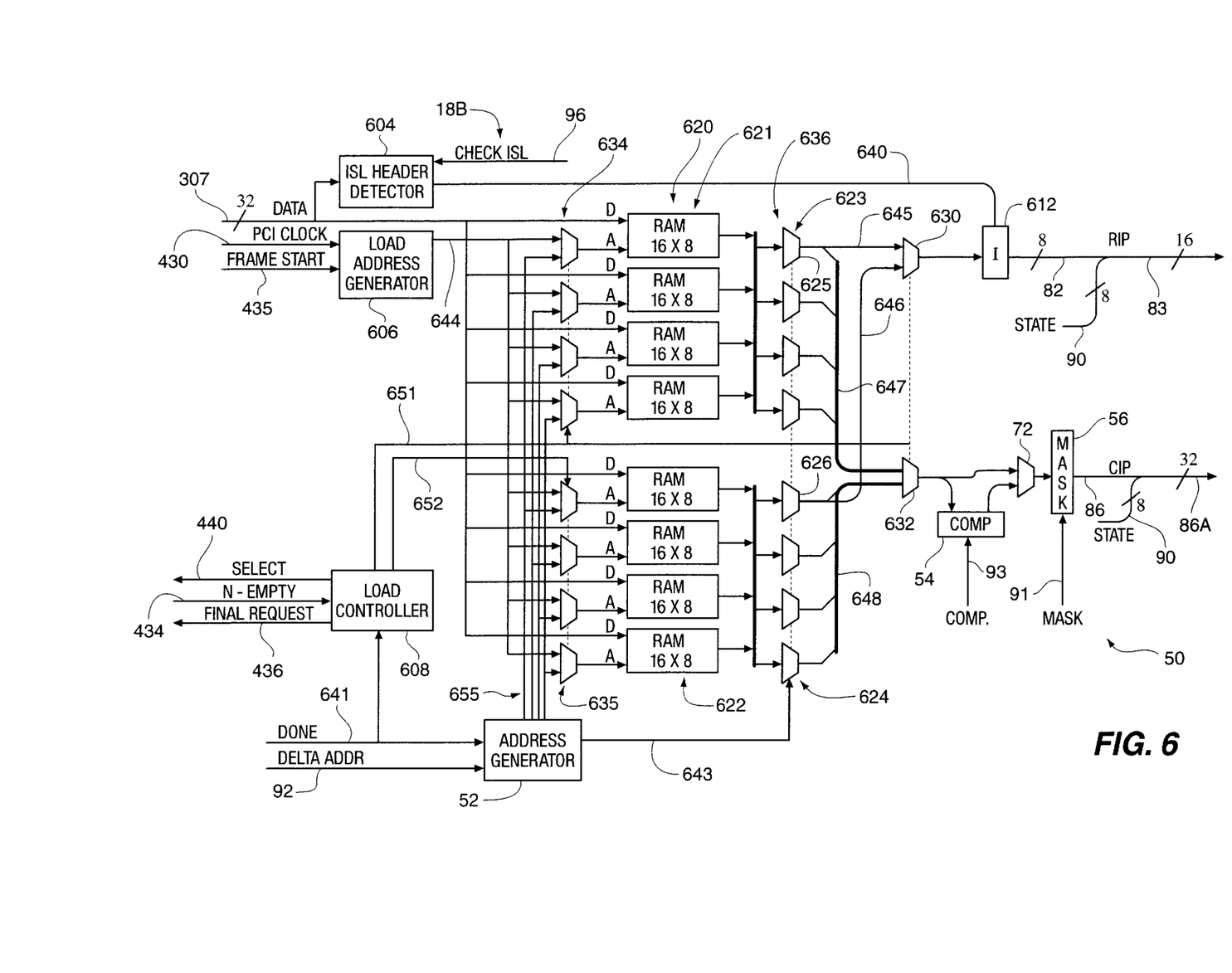
FIG. 6 is a block electrical diagram of the frame header buffer section of the statistics section of FIG. 5.

Since the embodiment shown in FIG. 2 only performs protocol determination, only the frame header portion of each frame is required to be analyzed. Thus, the input buffer 18 (FIG. 1) includes a FIFO buffer section 18A (FIG. 3) that sorts out the frame header from each frame and passes it to a frame header buffer 18B (FIG. 6). Incoming 64 bit wide data on the PCI bus 16, which is of a bursty nature, is debursterized and truncated in the FIFO buffer section 18A, and then written into the frame header buffer 18B to enable the ASM 20 to have random access to the data packet header. As will be discussed in more detail below, the input buffer 18 passes 32 bit data segments to the state machine 20 on line 30.

The CAM 62 and ASM RAM 64 are programmed with the protocol determination algorithm. It is the task of the ASM 20 to use the protocol determination algorithm in the CAM 62 and ASM RAM 64 to examine the various fields of each frame in turn and make decisions about what the protocol is. The RAM is faster than the CAM on making 16 bit lookups, and is used for decision making on protocol fields of 8 bits or less. The CAM is slower than the ASM RAM for lookup as it needs more cycles to operate and each cycle is slower than a similar RAM cycle, but it can match patterns up to 128 bits wide. It is particularly useful for address and port fields. It is easiest to understand the operation of the ASM 20 by first understanding the input and output of the CAM 62 and ASM RAM 64, which are most essential to the system, and then considering the other functions which are less important. The general format of the CAM and ASM RAM input and output signals is shown in Table I.

TABLE 1

| RAM INPUT | Stack (4) | Level (4) | Pattern (8) | | | |
|---|---|---|---|---|---|---|

| CAM INPUT | Stack (4) | Level (4) | Pattern (24, 56, 88 or 120) | | | |
|---|---|---|---|---|---|---|

| OUTPUT | Stack (4) | Level (4) | Mask (4) | Addr offset (6) | Instructions (12) | Count. Index (8) |
|---|---|---|---|---|---|---|

The ASM RAM input is always 16 bits, the CAM input is 32 bits (see below), and the output of both the CAM/ASM RAM combination and ASM RAM is 38 bits. The first thirty-eight bits define a specific portion of the CAM and ASM RAM in which codes for subsequent cycles of the analysis process are stored. For convenience, these eight bits are divided into two four-bit sections, the first of which is called the "stack" and the second of which is called the level. Generally the stack corresponds to the particular protocol type, while the level corresponds to the number in a sequence of steps required to parse or analyze the protocol type. Together, the stack and level define the state of the state machine 20. Thus, any cycle in the analysis sequence can be defined by the state x,y where x is the stack and y is the level. The last eight bits of the ASM RAM input is the pattern from the frame header that is to be matched, and the last 24, 56, 88, or 120 bits of the CAM input is the pattern from the frame header to be matched. The CAM manager 60 is capable of storing up to four subsequent 32 bit data bits, so that it can present 32, 64, 96, or 128 bits to the CAM. The last 30 bits of the output are divided into four bits which define the mask, six bits which define the address offset, i.e. the delta address signal, twelve bits of general instructions, and eight bits of counter indexing information. For simplicity, in FIG. 2, only two general instructions, i.e. the comparison instruction and the trigger instruction, are shown and discussed. As we shall see in the detailed description below, there are many additional instructions that are output by the CAM 62 and ASM RAM 64.

To understand the operation of ASM 20, we assume that an initial data segment from a new frame has just been output by frame header buffer section 50. The stack and level for a new frame are both defined as zero, i.e. the state is 0,0. If the data segment is eight bits or less it will go to the ASM RAM 64 as indicated by the line 82. Since the stack and level are both zero, the bits added by state line 84 are zero and selector 76 is in the default state that allows the data segment to pass through directly to ASM RAM 64. If the default 0,0 state was such that the data segment of interest is more than eight bits it will go to the CAM manager 60 via lines 81, 85, 86 and 86A, and the mask 56, since the default state of selector 76 is to pass the CAM output. If the first data segment is more than eight bits, and the CAM finds a match, the CAM outputs on line 87 a 10 bit address corresponding to the segment, at the front of which address is added the bits 111111, which is a unique code that indicates to the ASM RAM that it is getting an input from the CAM. Selector 74 passes this to the ASM RAM, since the default state of the selector is pass. If there is no-match, the no-match line 88 goes high and selector 74 does not pass the signal on line 87, but instead passes a unique signal, i.e. the signal 1111,0000 concatenated with the state, that is, the first eight bits are 1111,0000 and the last 8 bits are the current state defined by the stack and level. Thus, whatever the first data segment presented to the state machine 20, the ASM RAM 64 will receive a sixteen bit address.

In response to the address, the ASM RAM will generate a number of outputs which can include: a 6 bit delta address signal output on line 92 to address generator 52 which creates a new address to access a new 32 bit word from the frame header buffer 18B; a new state x,y based on the protocol type (initially unknown and set to 0) and a count (level), which state is output on line 90; a mask signal output on line 91 which is interpreted by filter 56 to pass only the certain bytes of the frame header buffer output that need be examined; instruction bits, one of which is output on line 89 selects whether the RAM (16 bit lookup) or CAM (32, 64, 96 or 128 bit lookup) will be used next cycle, and others which are output on line 93 to compare register 54, which will be discussed below. For example, if the first byte examined is the type/length field (MSB) then RAM-lookup is used as this field is only 8 bits wide. Depending on whether this field is >=0x06, the RAM will give the next frame header locations (via a cumulative address offset) to be examined and how they are to be examined (RAM-lookup or CAM-lookup). In this manner, the state machine 20 walks through the algorithm stored in the CAM and ASM RAM combination. At some stage in the protocol, special actions are required, such as counting an instance of a message type or doing a comparison of source and destination port fields. These "special" functions are triggered by output from the ASM RAM. Examples of these special instructions are: Write 1st word into the CAM comparand register; Write 2nd, 3rd or 4th words into the CAM comparand register; Get the CAM match address; Reset algorithm as end of header processing has been reached; Instructions to increment latch 67 via line 94 to increment the frame counter by one and/or instructions to adder latch 68 via line 95 to advance the byte counter by a particular number of bytes to record the band width of a protocol of interest; Output instructions on line 93 to compare register 54 to compare two 16 bit numbers and select the lowest; Check for ISL header; Generate trigger signal on line 40 to capture RAM 80; Add unknown data pattern to list of known data patterns in the CAM; Select 32, 64, 96 or 128 bits CAM pattern matching. The frame size is input on line 31 to latch 68 to enable it to determine the number of bytes of the protocol, and the capture RAM 80 communicates with the PCI bus via line 33 to enable it to capture a frame or set of frames in response to the signal on trigger line 40.

The logical system of FIG. 2 can be implemented in many ways. An exemplary and preferred embodiment follows.

DETAILED DESCRIPTION

Figure 3:
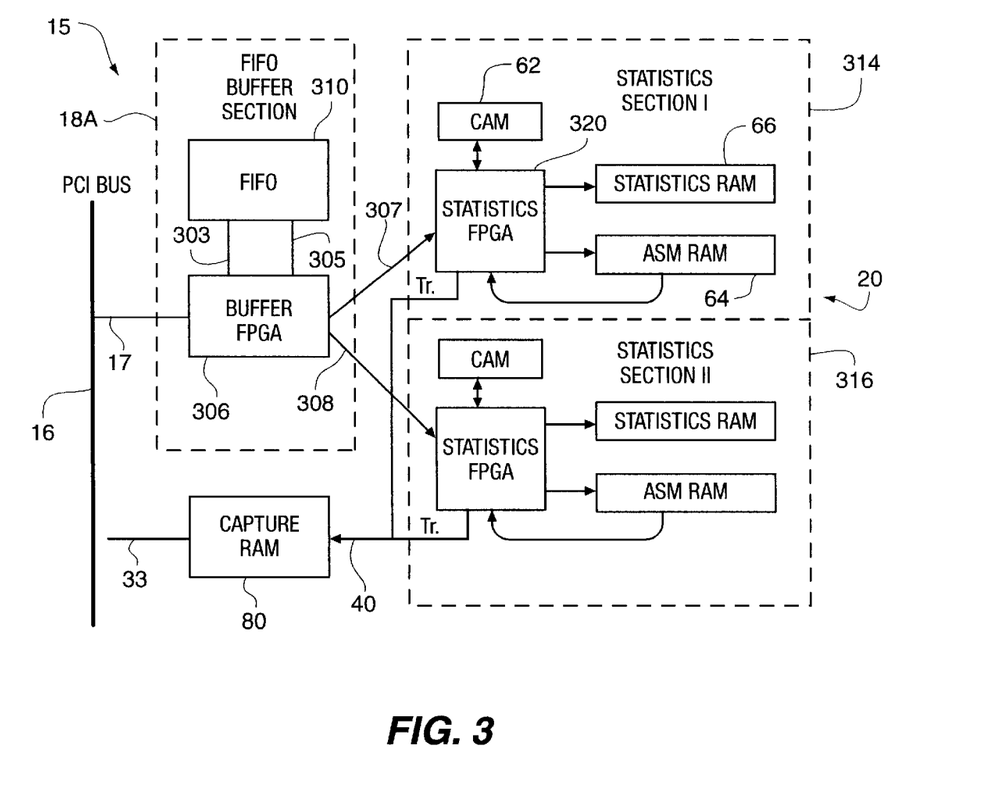
FIG. 3 is a block diagram showing the hardware with which the preferred embodiment of FIG. 2 is implemented.

FIG. 3 shows a block diagram of the hardware implementation of the preferred embodiment of protocol analyzer 15. It includes FIFO buffer section 18A, ASM 20 and capture RAM 80. In this embodiment, ASM includes two statistics sections 314 and 316. FIFO buffer section 18A alternately sends frames to the first statistics section 314 and then the second statistics section 316. The invention contemplates that there could be embodiments with one statistics section and embodiments with three or more statistics sections. Generally, the number of statistics sections is determined by the time it takes for one statistics section to fully analyze a frame, and the expected transfer rate of frames on bus 16. The number of statistics sections are chosen so that in normal operation all frames passing on Bus 16 can be analyzed. The more deeply it is desired to analyze a frame, the more statistics sections there would be, since deeper analysis requires more time. Since each statistics section is identical, we shall discuss in detail only the first section 314 and its interaction with FIFO buffer section 18A and capture RAM 80.

FIFO buffer section 18A includes a field programmable gate array (FPGA) 306, named "Buffer FPGA", and a first-in-first-out (FIFO) register 310, which communicate on lines 303 and 305. Buffer FPGA communicates with statistics sections I and II on lines 307 and 308, respectively. As indicated above, capture RAM 80 communicates with PCI bus 16 on sub-bus 33 and with each statistics section via a trigger line 40. Statistics section I includes an FPGA named "statistics FPGA", CAM 62, counter RAM 66, and ASM RAM 64. In the preferred embodiment RAM 64 and RAM 66 are separate blocks implemented in multiple RAM ICs.

Figure 4:
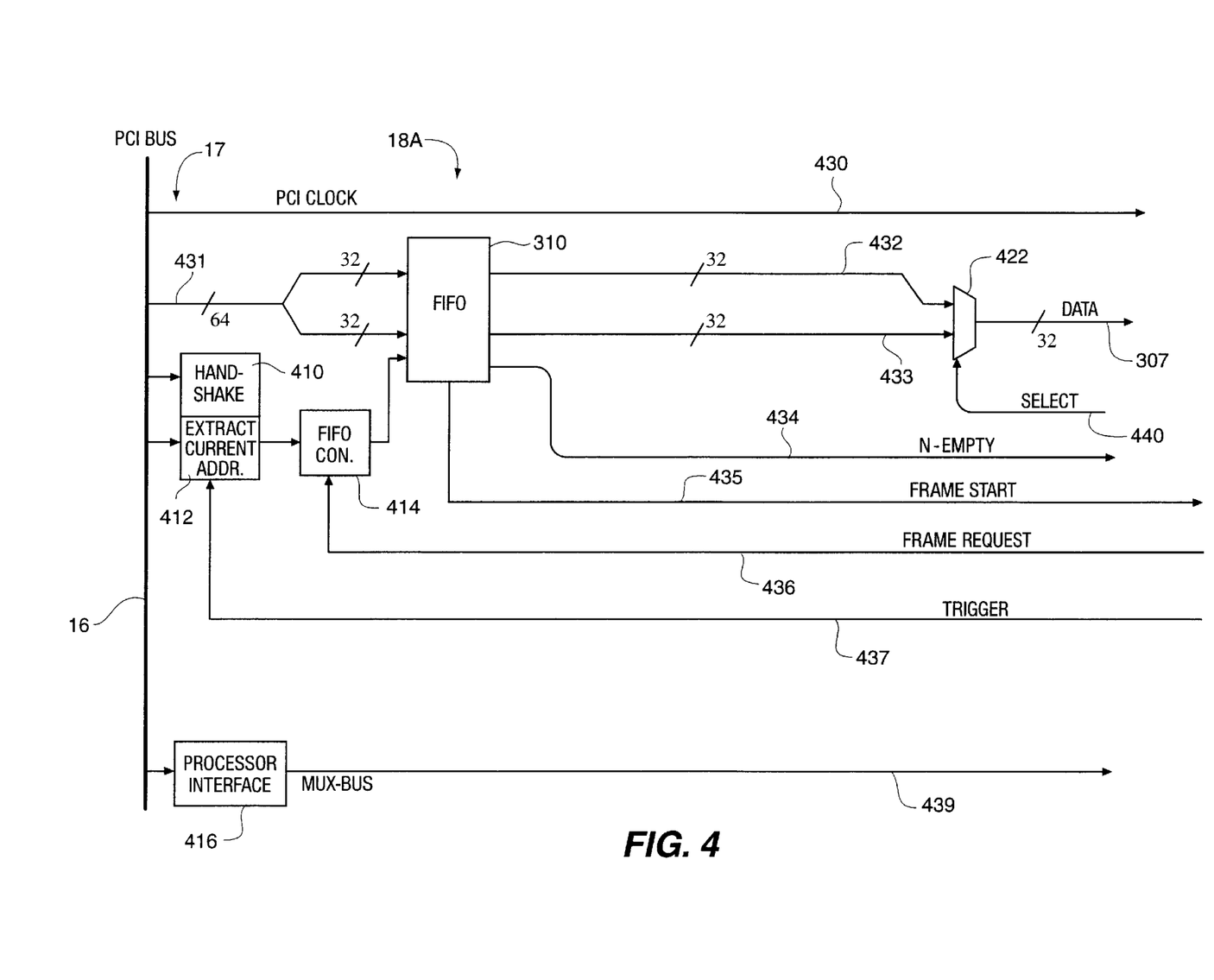
FIG. 4 is a block electrical diagram of the FIFO buffer section of the embodiment of FIG. 3.

Turning now to FIG. 4, a block diagram illustrating the details of the FIFO buffer section 18A is shown. It includes FIFO 310, handshake logic unit 410, extract current address logic unit 412, FIFO control logic unit 414, processor interface logic 416, and selector 422. It also includes PCI clock line 430 and frame which simply passes signals through FIFO buffer section 18A to statistics section 314. Handshake logic unit 410 performs functions to coordinate the exchange of data between FIFO buffer section 18A and processors and peripherals connected to bus 16, as known in the art. Logic unit 412 monitors the FRAME, TRDY, and IRDY signals of the PCI bus and extracts the current address being accessed at any particular time. It also detects write cycles between a processor on one end of the PCI bus 16 and a memory on the other end of the bus, which are defined by a predetermined address range. Finally, it will latch the PCI address of the current frame and generate a processor interrupt when trigger line 437 is enabled. FIFO control logic unit 414 detects the start of frame headers and issues a command to commence the writing of up to 128 bits of subsequent data to the FIFO. The frame header is written to the FIFO on the rising edge of the PCI clock. The writing is preferably done 8 bytes wide. The FIFO control logic unit 414 also initiates a read by the statistics section from FIFO 310 upon receiving a frame request on line 436 from statistics section 314. When the FIFO begins to send a frame, a frame start signal is sent on line 435. The FIFO also informs the statistics section that it has one frame or less stored with a "nearly empty" (N-empty) signal on line 434.The FIFO operates in two 32 bit subsections, each of which sends data on one of lines 432 and 433, respectively. Selector 422 selects which of lines 432 and 433 to read in response to a signal from the statistics section 314 on line 440 and sends the data to the statistics section 314 on line 307. Processor interface 416 interfaces with a processor on PCI bus 16 when programming the CAM 62 and ASM RAM 64 and reading the statistics from statistics RAM 66. It converts PCI register accesses to the statistics section 314 into a multiplexed-bus (mux-bus) arrangement for connection to the FPGAs in the statistics section. Specifically, interface 416 comprises a multiplexer which converts a 32 bit PCI address into two 16 bit words and passes them serially on the mux-bus line 439, and also converts a 32 bit PCI data segment to two 16 bit data words that it passes them serially on the mux-bus line 439. This permits the number of interconnect lines between chips in the system 15 to be significantly reduced, without impairing performance of the system. That is, while this requires a longer time for signals to pass on mux-bus 439, this bus is only used when programming and reading the system 15, and thus does not impact the speed of analyzing data. All of the logic in FIFO buffer section 18A, except the FIFO, is implemented with the buffer FPGA 306. Other temporary storage hardware, such as a RAM could be utilized instead of the FIFO, however the FIFO is preferred since it is a simple way to improve the performance of the system 15 so that it must only keep up with the average rate of data transfer on the Bus 16, rather than the instantaneous rate of transfer. That is, the FIFO allows data to arrive in rapid bursts, but be analyzed at a lower average rate that is slower than the peak burst rate.

Figure 5:
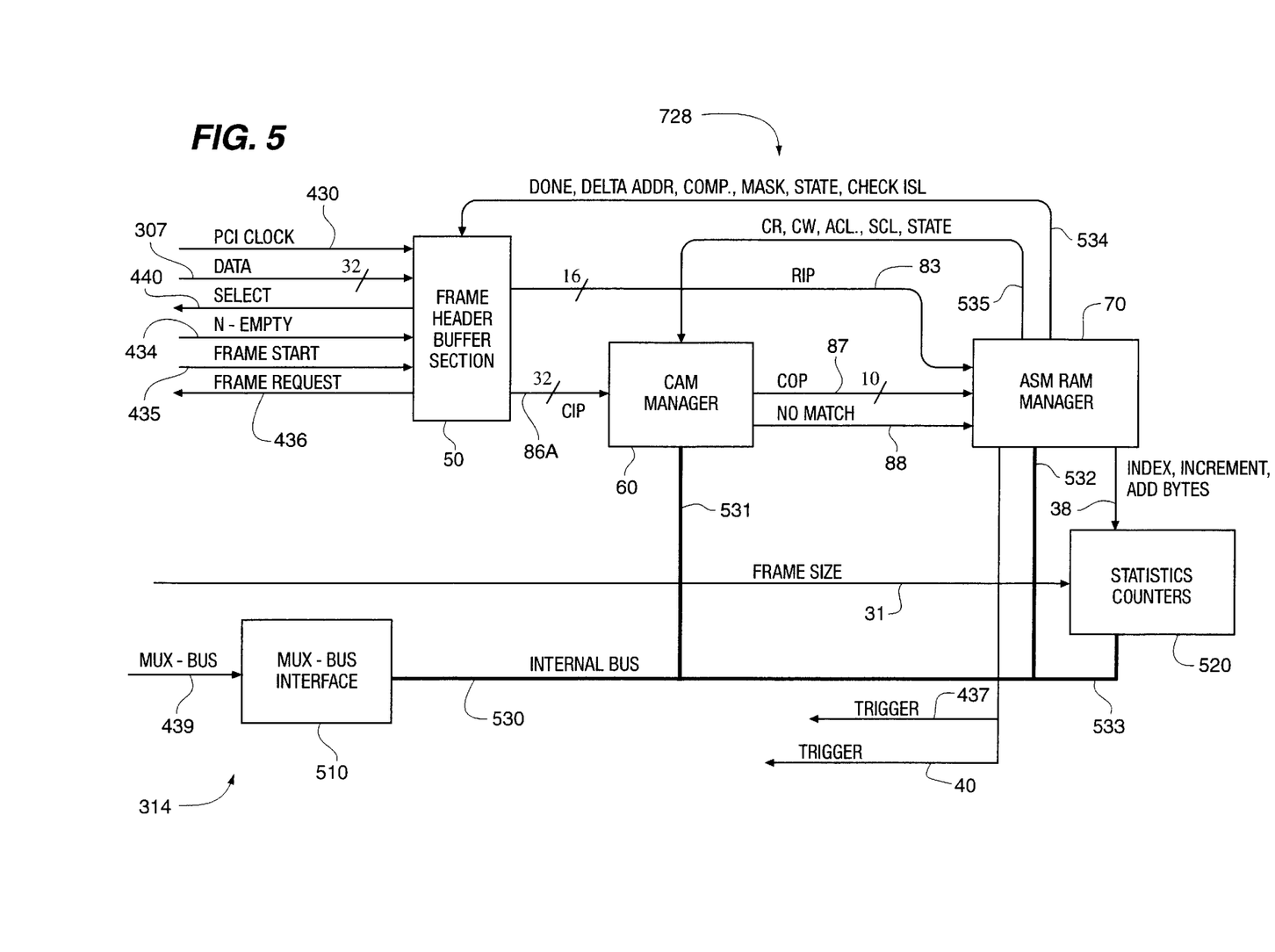
FIG. 5 is a block electrical diagram of a statistics section of the embodiment of FIG. 3.

Turning now to FIG. 5, a block diagram illustrating generally the logical organization of statistics section 314. It should be understood that the actual hardware from which the section 314 is constructed is relatively simple, and is shown in FIG. 3. In this and subsequent figures, we shall focus on the logical organization, which defines the programming of the statistics FPGA 320 and the connection of the statistics FPGA to the CAM 62 and RAMs 64 and 66. Except for the capture RAM 80, FIG. 5 has essentially the same content of FIG. 2, except that the signals are given in more detail in FIG. 5; the numbering of FIG. 2 is carried over into FIG. 5 where the parts are identical. Statistics section 314 includes frame header buffer section 50, CAM manager 60, ASM RAM manager 70, statistics counter section 520, and mux-bus interface 510. The PCI clock, data, n-empty, and frame start signals are input to frame header buffer section 50 from FIFO buffer section 18A on lines 430, 307, 434, and 435, respectively, and the select, and frame request signals go to FIFO buffer section 18A from frame header buffer section 50 on lines 440 and 436, respectively. The signals done, delta address, compare, mask, and state are input to frame header buffer section 50 from ASM RAM manager 70. The RAM input pattern (RIP) is output to ASM RAM manager 70 by frame header buffer section 50 on line 83, and the CAM input pattern (CIP) is output to CAM manager 60 by frame header buffer section 50 on line 86A. The mux-bus signal is input to mux-bus interface 510 from FIFO buffer section 18A on line 439. The frame size signal is output to statistics counter 520 on line 31, while the mux-bus interface communicates with the CAM manager, ASM RAM manager, and statistics counter 520 via internal bus 530. CAM manager 60 receives the CAM read, CAM write, accumulate, set CAM cycle and state signals from ASM RAM manager 70 on line 535. CAM manager outputs the CAM output pattern and the no-match signal to ASM RAM manager on lines 87 and 88, respectively. The ASM RAM manager outputs the index, increment, and add bytes signals to statistics counter section 520, in addition to the other outputs mentioned above.

The frame header buffer section 50 reads data from the FIFO 310 (FIG. 4) if the n-empty signal indicates that stored frames are available. The 32 bit wide frame header is clocked into the frame header buffer section 50 using the PCI clock and takes 480 nanoseconds (nS) to transfer the minimum of 64 bytes of header and up to 960 nS for the maximum of 128 bytes of header. The frame header buffer section 50 generates both the RAM and CAM lookup patterns based on addressing, state, check ISL, compare and mask information from the ASM RAM manager. If a CAM access is scheduled, the CAM manager either delivers the CAM address at the pattern match or it indicates a no-match. The type of CAM access (1, 2, 3 or 4 word) can be set up prior to the actual pattern matching via the set cam cycle instruction from the ASM. The CAM manager can also be set up to automatically add an unknown pattern to its list of known patterns. The ASM manager generates the instructions for the next cycle based on its pre-programmed lookup table. To gather statistics, the ASM provides a counter index and an instruction to increment one of the two associated counters and/or add the frame size as given by the frame size signal on line 31 to the other associated counter. The "index" signal tells the statistics counter which of the counters to be accessed. If the ASM manager indicates that a snapshot trigger should be generated, it tells the FIFO buffer 18A on line 437 which latches the PCI address and interrupts the processor and also tells the capture RAM via line 40 to capture the frame at that PCI address.

Turning now to FIG. 6, a detailed logic diagram of the frame header buffer section 50 is shown. Frame header buffer section 50 includes inter-switch link (ISL) header detector 604, load address generator 606, load controller 608, address generator 52, comparator 54, mask generator 56, ISL signal generator 612, and a frame header buffer 18B including a RAM section 620 divided into eight 16×8 bit registers, selectors 630, 632, and 72, eight RAM input selectors divided into an upper set 634 of four selectors and a lower set 635 of four selectors, and eight RAM output selectors 636, divided into an upper set 623 of four selectors and a lower set 624 of four selectors. In response to the check ISL signal input from ASM RAM Manager 70 on line 96, ISL detector reads the data signal from FIFO buffer 18A on line 307, and outputs a signal to ISL signal generator 612 on line 640 when an ISL signal is detected. Data line 307 also connects to the data input on each of RAMs 620. The PCI clock signal on line 430 and the frame start signal on line 435 are input to load address generator 606, the output of which is applied to each of selectors 634 via line 644. The n-empty signal on line 434 is applied to load controller 608, which outputs the select and frame request signals on lines 440 and 436, respectively. Load controller 608 also outputs select signals to the four upper RAM input selectors 634, and selectors 630 and 632 via line 651 and to the four lower RAM input selectors 635 via line 652. The done signal on line 641 is input to load controller 608 and address generator 52. The delta address signal on line 92 is input to address generator 52. Address generator 52 outputs signals to one selector in the upper RAM input selectors 634 and one selector in the lower RAM input selectors 635 via each of four address lines 655. Address generator also outputs a select signal to each of selectors 636 via line 643. Each of selectors 634 and 635 has its output connected to the address input of a corresponding one of RAM registers 620. The output of each RAM register in the upper set 621 is applied to each of selectors 623, and the output of each of the RAM registers in the lower set 622 is applied to each of the selectors 624. The output of each of selectors 623 and 624 is applied to selector 632, while the output of selectors 625 and 626 is also applied to selector 630. The output of selector 630 is applied to ISL signal generator 612, and the output of ISL signal generator 612 is the line 82 which provides the eight bit RAM input pattern. The output of selector 632 is applied to the comparator 54 and selector 72, the compare instruction signal on line 93 is applied to comparator 54, and the mask signal on line 91 is applied to mask generator 56. The output of selector 72 is applied to mask generator 56. The output of mask generator 56 is the CAM input pattern on line 86. Note that lines 641, 90, 91, 92, 93, and 96 are conductors that are part of line 534 (FIG. 5).

Some particular functions of the frame header buffer that have not yet been discussed are as follows. The ISL detector 604 looks for the 01000c0000 pattern as the data is loaded into the RAM. If it detects this pattern the protocol is an ISL, and the output on line 82 to the RAM is jammed at all ones when queried. The address generator takes the delta address signal and adds it to the latched previous address. It then generates four staggered addresses, one for each of the 4 ram blocks 621 or 622. The RAM 620 works as 2 pages, one of which is loading while the other is being processed. The pages are swapped when the load controller 608 sees that the "being processed" side is "done" and also that the "being loaded" side has finished loading. The signal output on line 86A is always a 32 bit or less signal, even though the signal output on line 86 from mask 56 is also a 32 bit signal. That is, on the initial cycle (0,0) 24 bits are generated on line 86 and eight bits are added via line 90 to complete the 32 bit signal output on line 86A, but on subsequent cycles the full 32 bits are generated on line 86.

Figure 7:
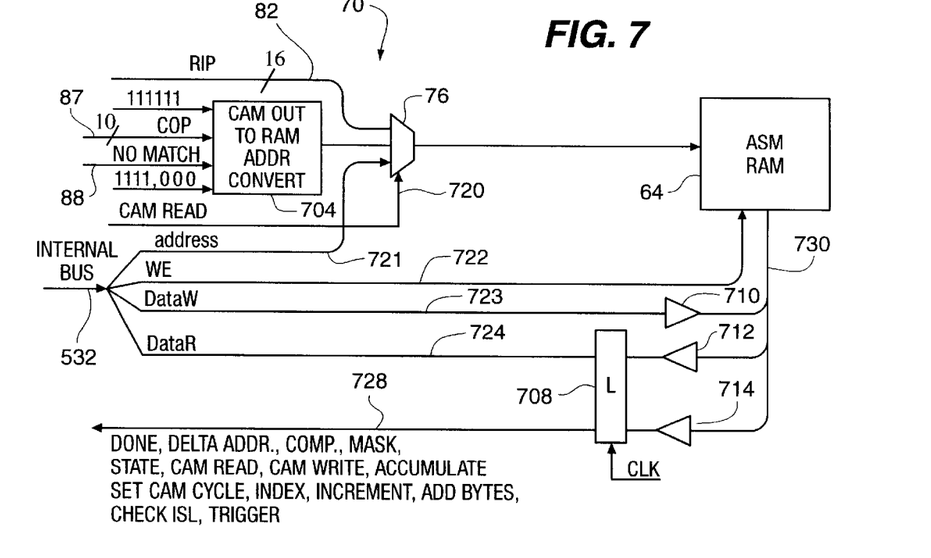
FIG. 7 is a block electrical diagram of the ASM RAM Manager portion of the statistics section of FIG. 5.

The ASM RAM manager is shown in FIG. 7. It includes the ASM RAM 64, and a CAM output to RAM address converter, which converts the pattern output by the CAM 62 to an appropriate RAM address. It also includes selector 76, latch 708, and buffers 710, 712 and 714. The CAM output pattern is input to convertor 704 via line 87, and the no-match signal is input via line 88. The 111111 signal and the 1111,0000 special case signals are also input to convertor 704. A CAM read signal output by ASM RAM manager on line 728 is also input to the convertor 704. The output of convertor 704 is applied to selector 76. The CAM read signal is applied as a select signal to selector 76 via line 720. The RAM input pattern is input to selector 76 via line 82. The internal bus line 532 carries a number of signals to and from ASM RAM manager 70: an address signal on line 721 which is applied to selector 76; a write enable signal on line 722 and a data write signal on line 723 which are applied to ASM RAM 64; and a data read signal on line 724 which is output by ASM RAM 64. These signals are used when programming and reading the ASM RAM. The ASM RAM also outputs the done, delta address, compare, mask, state, CAM read, CAM write, accumulate, set cam cycle, index, increment, add bytes, check ISL and trigger signals on line 728. Latch 708 latches the signals output from ASM RAM 64. Note that the line 728 is the same as lines 38, 40, 437, 534 and 535 of FIG. 5. The functions of the ASM RAM manager and the use of its output signals has been discussed above or will be discussed below.

Figure 8:
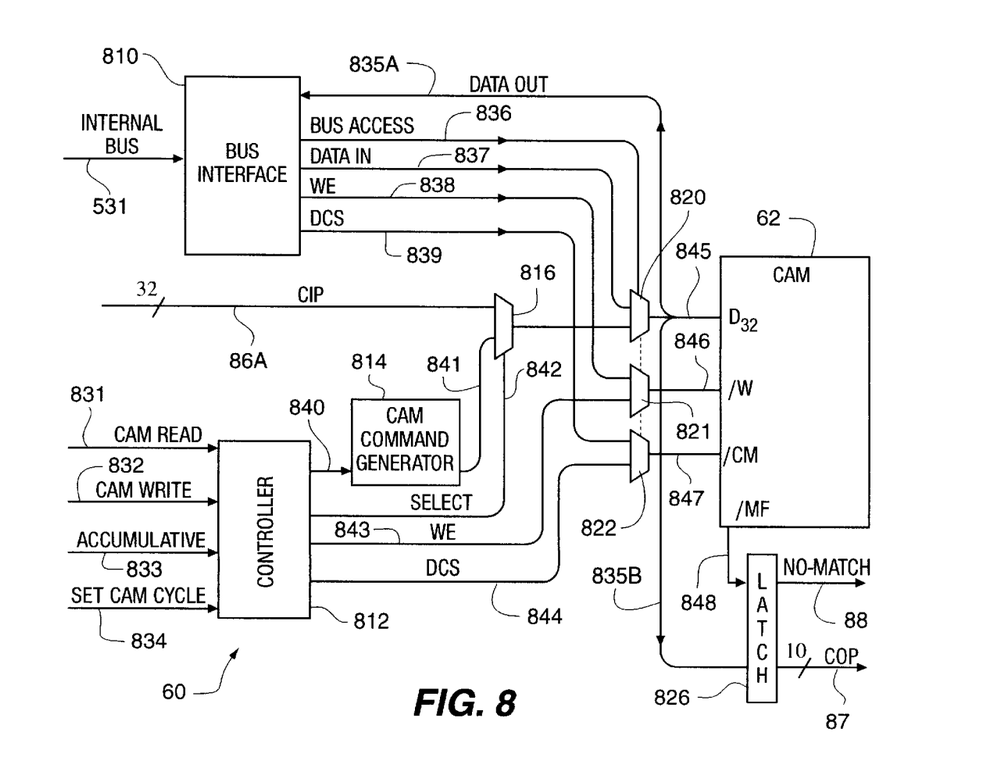
FIG. 8 is a block electrical diagram of the CAM Manager portion of the statistics section of FIG. 5.

The details of the CAM manager 60 logic is shown in FIG. 8. CAM manager 60 includes CAM 62, Bus interface 810, controller 812, CAM command generator 814, selectors 816, 820, 821, and 822, and latch 826. The internal bus 531 connects to the bus interface 810. Bus interface outputs the following signals: a bus access signal on line 836 to selector 820, which acts as a select signal for this selector; a data signal on line 837 which is applied as one input to selector 820; a write enable signal on line 838 which is applied as one input to selector 821; a data/command select signal on line 839, which is applied as one input to selector 822. A data signal output by CAM 62 on its 32 bit data input/output terminal, $D_{32}$, is applied to bus interface 810 on line 835A. The CAM input pattern signal is input to selector 816 on line 86A. The CAM read, CAM write, accumulate, and set CAM cycle signals are applied to controller 812 via lines 831, 832, 833, and 834, respectively. The controller outputs signals on line 840 to CAM command generator 814 which instruct the generator 814 to issue an appropriate command recognizable by CAM 62; examples of these commands will be discussed below. The output of the CAM command generator is applied as one input to selector 816 via line 841. A select signal is applied to selector 816 by controller 812 via line 842. A write enable signal is applied by controller 812 as one input to selector 821 via line 843. A data/command select signal is output by controller 812 on line 844 and applied as one input to selector 822. The output of selector 820 is applied to the 32 bit data input/output, $D_{32}$, of CAM 62. The data input output, $D_{32}$, also outputs its signal on line 835B, which is applied to latch 826 and provides the CAM output pattern on line 87. The output of selector 821 is applied to the write enable input, w/, of the CAM 62. The output of selector 822 is applied to the data/command select input, /CM, of CAM 62. The output of the match flag output, /MF, of the CAM 62 is applied via signal 848 to latch 826 and provides the no-match signal on line 88. The latch 826 latches the CAM output pattern and the no-match signal applied to it.

As indicated above, data can be either written into the CAM 62 or read out of the CAM 62 through the $D_{32}$ port. The write enable signal input at /W determines the direction of data flow. Commands are also input into the CAM 62 through the $D_{32}$ port. The signal applied to the /CM input determines whether the input is data or a command. The signal on the /MF output is indicative of whether or not a match has been made during a compare cycle. The CAM, when being used as a lookup table, operates on 2 to 5 cycles: on the first to fourth clock tick data to be compared goes in; on the subsequent clock tick, an address or a no-match signal come out. On receiving the cam write signal, the controller 812 writes the presented CAM input pattern to the comparand register of the CAM 62. The set cam cycle signal includes information on the number of thirty-two bit words that will be written into the comparand register before CAM is expected to match the data. On receiving the set cam cycle signal, the controller uses the temporary command override (TCO) command to write to the segment control register of the CAM to set the expected number of 32 bit words before a compare is needed. This may be one, two, three, or four. On receiving accumulate signal, if a no-match is the result of a compare, then the controller sets the SPD instruction to the next free address and then a data move (MOV) command moves the comparand register into the next free address. On receiving CAM read signal, the controller executes a read to get the address of the match from the status register in the CAM. When programming, the processor has free access to read and write both data and command registers. For further information on operation of a CAM, the specifications and documentation for a CAM may be consulted.

Figure 9:
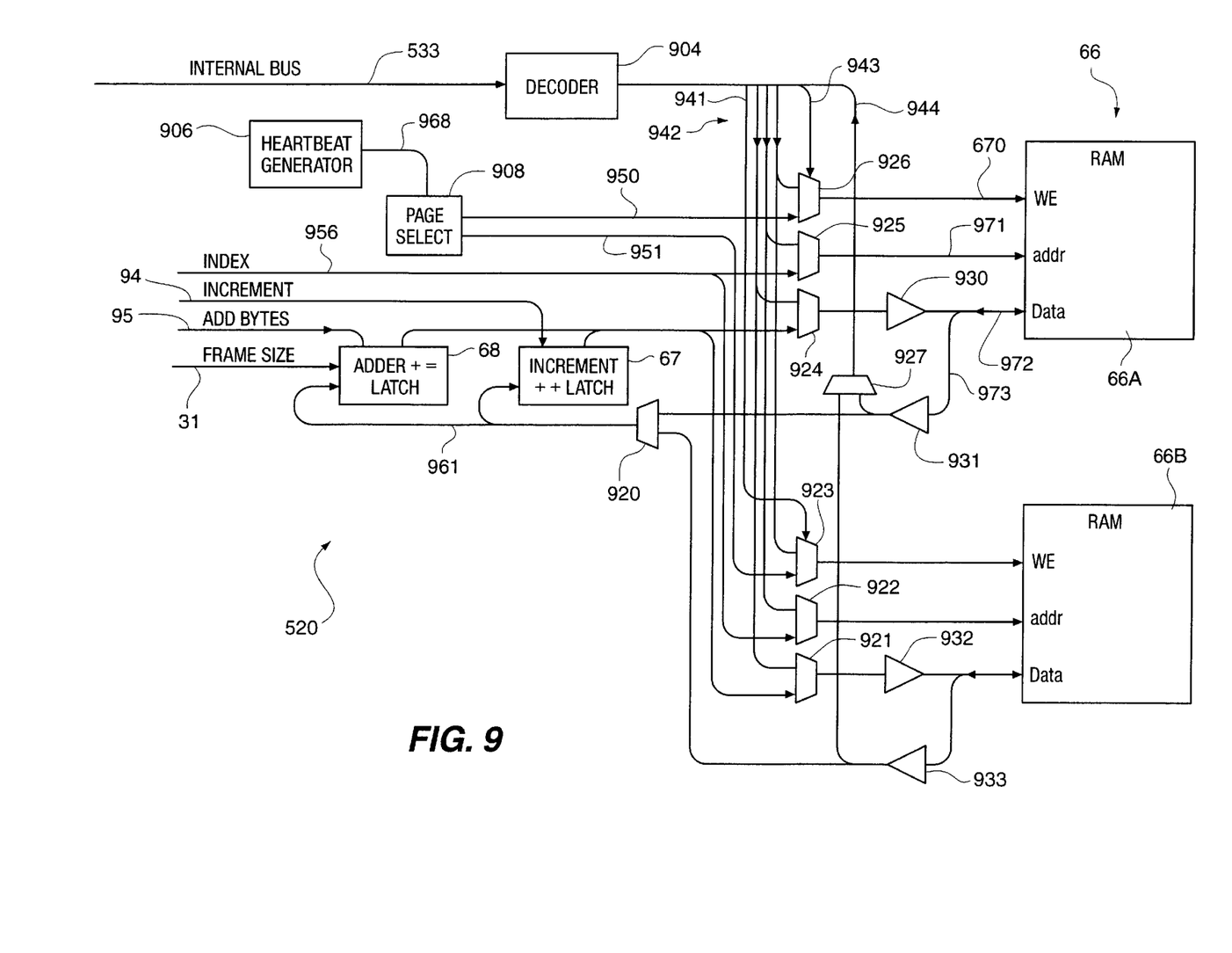
FIG. 9 is a block electrical diagram of the Statistics Counters portion of the statistics section of FIG. 5.

The logical organization of statistics counter section 520 is shown in FIG. 9. The statistics counter section 520 includes the counter RAM 66, which is divided into two sections 66A and 66B. Statistics counter section 520 also includes address decoder 904, heartbeat generator 906, page select logic unit 908, adder latch 68, increment latch 67, selectors 920–927, and buffers 930–933. The counter can be seen as divided into two separate counter sections, a first section comprising RAM 66A, selectors 924–926, and buffers 930 and 931, and a second comprising RAM 66B, selectors 921–923, and buffers 932 and 933. Except for the connections between page select logic 908 and selectors 926 and 923, the design and operation of the first section is the same as the second, and thus we will only discuss the first in detail. As will be seen below, while one RAM is being written to, the content of the other RAM is saved and remains static. Decoder receives the internal bus signal on line 533 and applies suitable signals to the inputs of each of selectors 924–926 via lines 942, as well as the select signal to each selector on line 943, while the select signal is applied to selectors 921–923 via line 941. The output of selector 926 is applied to the write enable input of RAM 66A, the output of selector 925 is applied to the address input of RAM 66A, and the output of selector 924 is applied to the data input/output of RAM 66A through buffer 930. The data input/output of RAM 66A is also connected to the inputs of selectors 920 and 927 through buffer 931. The output of selector 927 provides the data output to the internal bus via line 944. The heartbeat generator 906 provides an output on line 968, preferably once every second, which is applied to page select logic 908. Page select logic 908 applies an output signal to the input of selector 926 via line 950 and another output signal to the input of selector 923 via line 951. The index signal is applied to the input of selectors 925 and 922 via line 956, the increment signal is applied to increment latch 67 via line 957, the add bytes signal is applied to the adder latch 68 via line 958, and the frame size signal is applied to adder latch 68 via line 31. The output of selector 920 is applied to increment latch 67 and adder latch 68 via line 961. The index signal tells the RAM which of its internal count registers to increment and/or add bytes. Typically, a statistics RAM 66A may include a hundred or more different statistics registers or counters.

The heartbeat generator 906 is a one second clock that switches the context of the two RAMs 66A and 66B every second. That is, for one second one RAM, say 66A will be "active" and the other RAM, 66B will be "inactive". The next second the roles of the RAMs are reversed. When a RAM is active, the incoming statistical data is stored in it. That is, if an increment and/or add bytes command comes in while a RAM is "active", the content of the appropriate register of the RAM is read into the corresponding latch which is then incremented and/or added to, then the contents written back to the appropriate register in the RAM. When a RAM is inactive, it can be read to pass the stored statistics information to a processor connected to bus 16. The processor bus has unrestricted read/write access to the RAMs but will observe the state of the heartbeat before accessing. It only accesses the "inactive" RAM, except for initialization purposes.

The FGPAs which parts of the buffers and statistics sections are preferably implemented in xilinx type FGPA's. A suitable CAM is an MU9C1965A Wide LANCAM™ manufactured by MUSIC Semiconductors, 254 B Mountain Avenue, Hadkettstown, N.J. 07840. The RAM may be any suitably fast RAM.

EXAMPLE

Parsing a TCP/IP Frame over Ethenet

Table II illustrates the format of a header, minus the preamble, for an Ethernet transmission control protocol/internet protocol (TCP/IP) frame, an exemplary frame that is analyzable by the protocol analyzer according to the invention.

TABLE II

| MAC destination address | |
|---|---|
| MAC source address | |
| Ethertype | |
| Vers/Hldr Len | Type of Service |
| Total Length | |
| Identification | |
| Fragmentation | |

| Time to live | Protocol |
|---|---|
| Header Checksum | |
| Source IP address | |
| Destination IP address | |
| TCP Source port number | |
| TCP Dest port number | |

| Time to live | Protocol |
|---|---|
| Header Checksum | |
| Source IP address | |
| Destination IP address | |
| TCP Source port number | |
| TCP Dest port number | |

Figure 10:
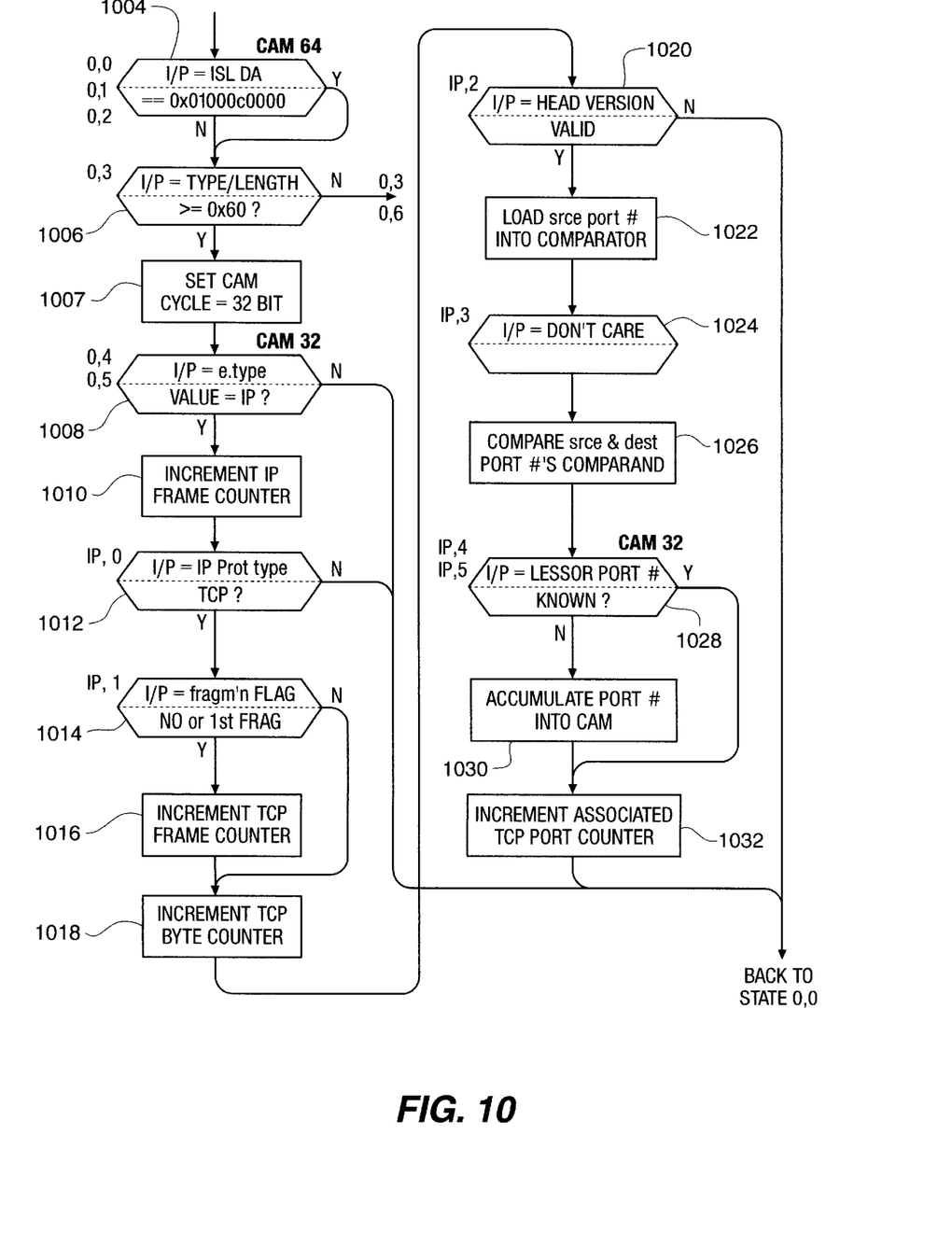
FIG. 10 is a flow chart showing an example of the parsing of a TCP/IP frame by the protocol analyzer according to the invention.

Each vertical division or row of the table represent two bytes. For example, the MAC destination address occupies the first six bytes of the header, and the Ethertype occupies the 13$^{th}$ through 14$^{th}$ bytes of the header. If a row is divided into columns then the two bytes are divided correspondingly from left to right. For example, the service type occupies the 16th byte of the header. FIG. 10 is a flow chart illustrating the parsing of a particular TCP/IP frame. In this flow chart each box with pointed ends represents a CAM or ASM RAM cycle in which a decision is made. For each such cycle there is an input to and an output from either the CAM or ASM RAM. If the cycle is a CAM cycle, the word CAM is written at the top right of the decision box along with a number indicating whether it is a 32, 64, 96 or 128 bit CAM cycle. The state of the ASM 20 for the cycle is indicated at the upper left of the box. Boxes without pointed ends are steps that take place subsequent to a cycle, but do not require another cycle or decision to be made. Table III shows the input and output for each cycle. In this case the communications system is Ethernet, so the protocol stack is determined from the ethertype (ET) field bytes 13, 14 and shown in the column ET.

Referring now to Tables II and III and FIG. 10, the first step 1004 is a 64 bit CAM cycle, and the state is the Initial condition, 0,0. The ASM 20 checks to see if the input (I/P) destination address (DA) is the ISL destination address, that is if it is equal to 0x01000c0000. Since this step is a preliminary step that takes place for every frame, it is implemented in hardware in the preferred embodiment, specifically the ISL header detector 604 implemented in the statistics FPGA 320 (FIGS. 3 and 6), but is shown as a CAM cycle here, to illustrate the flexibility of the system. In our example, the frame is not an ISL frame so the output tells the ASM 20 to skip 12 bytes and move to the most significant ethertype byte and parse it in the RAM. The system does this in step 1006, and finds the ethertype 0x08xx. Since this is greater than 0x60xx, this is not an 802.3 length field. The output instructs that the system go to state 0,4 and parse the entire ethertype in the CAM. Note that if the type had not been greater than or equal to 0x60xx, the system would have gone to state 0,6, which would lead to an entirely different portion of the algorithm, which portion is not shown here. The next step, i.e. state 0,4 is a 32 bit CAM cycle, so the system sets the CAM cycle to 32 bits in step 1007. Step 1008 is a 32 bit CAM cycle, in which the ether type 0x0806 is recognized as IP and so the counter assigned to the IP protocol type is incremented in step 1010, and the system 20 passes to the zeroth IP state, i.e. IP,0, and steps ahead 11 bytes to the protocol type field and indicates a RAM cycle is next. If the ethertype had not been recognized, there would either have been an error or this frame would have been one that the system was not interested in counting, so the system would have gone back to state 0,0 and looked at a new frame. In step 1012, the IP protocol type is read in the RAM and is recognized as TCP. Again, if the type had not been recognizable, there would either have been an error or this frame would have been one that the system was not interested in counting, so the system would have gone back to state 0,0 and looked at a new frame. The instructions out of the RAM in step 1012 indicate that the next state is the IP,1 state, and the system should examine the data three bytes back, which places it in the fragmentation flag region of the frame, and that the next cycle is a RAM cycle. If there is no fragmentation or if this is the first fragment, the counter assigned to count TCP frames is incremented in step 1016, and then the bytes of the frame are counted in step 1018. If there is fragmentation and this is some other fragment then the first, which is the case here, then only the bytes are counted. The instructions in the IP,1 state tell the system to go back six bytes to look at the header length in a RAM cycle, and sets the next state to IP,2. If the header length field is not valid, again the system would go back to state 0,0 and look at a new frame. However, in step 1020 it is found that the header length is valid here, and this tells the system where the start of the TCP layer is. The instructions in step 1020 for this particular length field are that the system step ahead 20 bytes, where the TCP source port is located, and that this be loaded into the comparand register in the CAM, which is done in step 1022. Note that the comparand register in the CAM is different than the compare register 54; the former is a specific register in the CAM 62, while the latter is implemented in the statistics FPGA 320. The system then proceeds to state IP,3 as instructed. Regardless of the input, in step 1024, the ASM 20 asks for the destination port to be compared to the source port (I/P=xx) and the lesser to be presented to the ASM in next cycle, which is a CAM cycle. It also instructs that if the port is not recognized then it be added as a new pattern and statistics are to be gathered on it. As instructed, the ports are compared in step 1026, and the system proceeds to the IP, 4 state, which is step 1028. In this case, the port is not recognized, so in step 1030 the port is loaded into the CAM, and an instruction goes out that the associated statistics RAM count is to be incremented, which is done in step 1032. The algorithm is then reset back to the beginning to await a new packet.

pattern. On subsequent occurrences of the pattern, each occurrence will cause the new counter corresponding to the new pattern to be incremented.

Another feature of the invention is the use of an address offset value to locate the next portion of the data frame to be analyzed. As indicated above, the offset value is the positive or negative number of bytes that the system should go from the address of the current or first portion being analyzed, or which just was analyzed, to find the next portion or second portion to be analyzed. The offset value is used by address generator 52 to generate the address of the next portion of the frame to be analyzed. The use of the offset has two distinct advantages. First, it greatly reduces the number of different branches of the analysis algorithm, that is the number of states, that must be stored in the CAM 62 and RAM 64. That is, because the relative length of headers vary, so that the absolute address of a particular frame header may take on many different values, while the relative position of the various portions of the frame header does not vary nearly as much. Second, it significantly reduces the number of conductors that are needed to connect the output of the state machine to the address generator, since it takes much fewer conductors to carry the offset value than it takes to carry an absolute address.

There has been described a novel protocol analyzer and method of collecting information on the use of a packet

TABLE III

| INPUT | | | OUTPUT | | | | |
|---|---|---|---|---|---|---|---|
| ET | Level | Pattern | ET | Level | Mask | Addr += | Ram/Cam | Instruction |
| Default "output" at reset => | | | 0 | 0 | 1111 | 0 | Cam | Write 1st CAM 32-bit word |
| 0 | 0 | 01000C = 3 bytes of ISL | 0 | 1 | 1100 | +3 | Cam | Write 2nd CAM 32-bit word |
| 0 | 1 | 0000xxxx = rest of ISL | 0 | 2 | 0000 | 0 | Cam | Read CAM match address |
| 0 | 2 | xxxxxxxx | 0 | 3 | 1000 | +9 | Ram | Set CAM cycle = 32 bit |
| 0 | 3 | 08xxxxxx = 1st byte of ET | 0 | 4 | 1100 | 0 | Cam | Write 1st CAM 32-bit word |
| 0 | 2 | 0806xx = Full ethertype | IP | 0 | 1000 | +11 | Ram | Increment IP frame counter |
| IP | 0 | 06xxxxxx = IP prot type | IP | 1 | 1000 | −3 | Ram | |
| IP | 1 | 20xxxxxx = fragm'n flag | IP | 2 | 1000 | −6 | Ram | Increment TCP frame count Add__bytes to TCP byte count |
| IP | 2 | 47xxxxxx = ver/hdr len | IP | 3 | 0000 | +20 | Ram | Load comparator (inherent) |
| IP | 3 | xxxxxxxx | IP | 4 | 1111 | +2 | Cam | Perform compare & select smallest Write 1st CAM 32-bit word |
| IP | 4 | nnnnnnnn =port number | IP | 5 | 0000 | 0 | Cam | Read CAM match address |
| IP | >0 | xxxxxxxx | 0 | 0 | 0000 | 0 | Ram | Increment TCP port count Done frame analysis (reset) |

It is a feature of the invention that the lookup table utilizes a state machine rather than a processor and stored software. The preferred embodiment of the state machine includes a CAM and RAM, but it also could be implemented in other ways.

It is another feature of the invention that the lookup table utilizes a CAM. This permits long data portions to be rapidly identified. The address output by the CAM is preferably input into a RAM, but it could also be input into any other logic system at which information is stored at specific addresses. It is also possible that the addresses output could be simply transferred to a memory, and processed later.

A further feature of the invention is that the ability of state machine 20 to gather statistics on frames passing on the PCI bus 16 is not limited to predetermined frame and protocol types. If in examining a frame header a new pattern is found that has not been previously seen by system 15, ASM RAM Manager 70 can issue an instruction to logic unit implemented in statistics FPGA 320 to cause it to write the new pattern into the CAM. A new counter can also be added to counter RAM 66 to count the occurrences of the new network that permits the user to collect information on every frame transferred on a packet network, even at gigabit transfer rates, and has many other advantages. It is evident that, now that the invention has been fully disclosed, those skilled in the art may now make numerous uses and modifications of the specific embodiment described, without departing from the inventive concepts. For example, now that it has been disclosed that a relatively simple state machine can be used to collect packet network statistics, other state machines for that purpose can be designed. Now that it has been disclosed that a CAM is particularly adapted for use in a protocol analyzer, other protocol analyzers using a CAM can be designed. It is also evident that equivalent components or circuits can be substituted for the various components and circuits described herein. Additional features may be added. A greater or lesser number of parts may be used. Consequently, the invention is to be construed as embracing each and every novel feature and novel combination of features present in and/or possessed by the protocol analyzer system and information collection method disclosed.

I claim:

1. Apparatus for collecting network statistics information on a packet network, said apparatus comprising:
   an input buffer for storing a data packet traveling on said packet network;
   an electronic lookup table, communicating with said buffer, for analyzing at least a portion of said data packet and for providing an output signal including a statistics signal representative of said statistics information, said lookup table comprising a state machine including a content addressable memory (CAM) and a random access memory (RAM); and
   an electronic memory, communicating with said lookup table, for storing said network statistics;
   wherein said input buffer includes a logic unit for inputting said portion of said data packet into said CAM if its number of bits is greater than a predetermined number and inputting said portion of said data packet into said RAM if its number of bits is less than or equal to said predetermined number.

2. Apparatus as in claim 1 wherein said predetermined number of bits is eight bits.

3. Apparatus as in claim 1 wherein said state machine includes a content addressable memory (CAM) manager logic unit including said CAM and a random access memory (RAM) manager logic unit including said RAM, and said output signal comprises a signal output by said RAM manager logic unit.

4. Apparatus as in claim 1 wherein said state machine comprises a field programmable gate array (FPGA).

5. Apparatus as in claim 4 wherein said FPGA includes a data mask and a comparator.

6. Apparatus as in claim 1 and further including a capture RAM in communication with said state machine.

7. Apparatus as in claim 1 wherein said state machine has an input and an output and said output is electronically connected to said input.

8. Apparatus as in claim 1 wherein said output signal comprises an instruction selected from the group consisting of: an instruction to increment a count in a predetermined register of said memory; an instruction to add a new count register in said memory; an instruction to generate a snapshot trigger to cause a capture RAM to store a specific data segment traveling on said packet network; and an instruction to further analyze said data portion.

9. Apparatus as in claim 1 wherein there are a plurality of said data packets traveling sequentially on said packet network, said buffer stores said plurality of packets, there are a plurality of said state machines, and different ones of said state machines analyze different ones of said data packets.

10. Apparatus as in claim 1 wherein said data packet includes a header and said input buffer includes a header buffer for storing the header of said data packet.

11. Apparatus as in claim 1 wherein said state machine includes an inter-switch link (ISL) header detector.

12. Apparatus as in claim 1 wherein said input buffer includes a FIFO.

13. Apparatus as in claim 1 wherein said output signal includes a trigger signal and said apparatus includes a logic unit responsive to said trigger signal for storing the PCI address of a particular data packet.

14. Apparatus as in claim 1 wherein said apparatus includes an internal bus and a multiplexer for multiplexing signals traveling on said packet network onto said internal bus.

15. Apparatus as in claim 1 wherein said electronic memory includes a first counter portion and a second counter portion and said apparatus further includes heartbeat control logic for swapping said first counter portion and said second counter portion between an active state in which the counter is used to collect statistics information and an inactive state in which the counter is read.

16. Apparatus as in claim 1 wherein said portion of said data packet comprises a first signal located at a first address in said data packet and said output signal includes a delta address signal corresponding to an offset value, and said state machine includes an address generator responsive to said delta address signal for providing an address signal corresponding to a second address in said data packet offset from said first address by said offset value.

17. A method of collecting network statistics information on a packet network, said method comprising:
   storing a data packet traveling on said packet network in a buffer;
   inputting a first signal representing at least a portion of said data packet into an electronic state machine causing said state machine to output a second signal; and
   storing said second signal in an electronic memory, thereby recording said network statistics;
   wherein said electronic state machine is capable of a CAM cycle in which a signal input into said state machine is input into a content addressable memory (CAM) and a RAM cycle in which a signal input into said state machine is input into a random access memory (RAM), wherein said second signal includes an instruction as to whether the next cycle to be executed by said state machine is a CAM cycle or a RAM cycle, and said step of inputting said second signal comprises inputting said instruction thereby causing said state machine to execute a predetermined one of said CAM and RAM cycles.

18. A method as in claim 17 wherein said step of inputting and causing comprises inputting said second signal back into said state machine causing it to output a third signal.

19. A method as in claim 17 wherein said step of inputting comprises inputting said first signal into a content addressable memory (CAM) causing said CAM to output an address and inputting said address into a random access memory (RAM) and causing said RAM to output said second signal.

20. Apparatus for collecting network statistics information on a packet network, said apparatus comprising:
   an input buffer for storing a data packet traveling on said packet network;
   an electronic lookup table, communicating with said buffer, for analyzing at least a portion of said data packet and for providing an output signal including a statistics signal representative of said statistics information, said lookup table comprising a state machine; and
   an electronic memory, communicating with said lookup table, for storing said network statistics;
   wherein said portion of said data packet comprises a first signal located at a first address in said data packet and said output signal includes a delta address signal corresponding to an offset value, and said state machine includes an address generator responsive to said delta address signal for providing an address signal corresponding to a second address in said data packet offset from said first address by said offset value.

* * * * *